United States Patent [19]

Herden et al.

[11] Patent Number: 5,620,673
[45] Date of Patent: Apr. 15, 1997

[54] PROCESS AND APPARATUS FOR SEPARATING POLYCYCLIC AND POLYHALOGENATED HYDROCARBONS FROM EXHAUST GAS OF A SINTERING PROCESS

[75] Inventors: Hansjoerg Herden, Rodgau; Stefan Federhen, Frankfurt; Gernot Mayer-Schwinning, Bad Homburg; Hubert Roth, Bad Vilbel, all of Germany

[73] Assignee: Metallgesellschaft Aktiengesellschaft, Frankfurt am Main, Germany

[21] Appl. No.: 513,527

[22] Filed: Aug. 10, 1995

[30] Foreign Application Priority Data

Aug. 16, 1994 [DE] Germany ............... 44 29 027.6

[51] Int. Cl.⁶ ............................................. C01B 7/00
[52] U.S. Cl. ............................. 423/240 S; 423/245.1
[58] Field of Search .................. 423/204 S, 240 R, 423/239.1, 239.2, 245.1; 95/132, 142; 110/345; 502/60, 67; 75/433, 758

[56] References Cited

U.S. PATENT DOCUMENTS 4,053,531 10/1977 Kerr et al. .................. 260/672 R
5,028,338 7/1991 Hooykaas ..................... 210/679
5,254,797 10/1993 Imoto et al. .................. 588/207
5,476,533 12/1995 Stieler et al. .................. 75/758

FOREIGN PATENT DOCUMENTS

455152A1  11/1991  European Pat. Off. .
4012982   4/1990   Germany .
4403244A1 2/1994   Germany .
4413280A1 4/1994   Germany .

*Primary Examiner*—Deborah Jones
*Assistant Examiner*—Amy M. Harding
*Attorney, Agent, or Firm*—Michael J. Striker

[57] ABSTRACT

The process for separating toxic organic substances from a dust-containing exhaust gas from a sintering process, particularly a process of sintering iron ore, includes bringing the entire exhaust gas from a sintering conveyor into contact with clays, layer silicate, and diatomaceous earth or mixtures thereof within a gas-solids suspension for a reaction time of from 0.5 to 10 seconds above the dew point at a temperature from 90° to 180° C. and at a velocity from 6 to 200 meters per second. The median particle diameter, $d_{50}$, of the solid adsorption agent in the gas-solids suspension is from 5 to 100 micrometers and the mean suspension density of the gas-solids suspension is from 5 to 500 g solids per sm³ exhaust gas. The dust and other solids are subsequently jointly separated from the gas-solids suspension, and part of the separated solids is again contacted with the exhaust gas from the sintering conveyor. An apparatus for carrying out the process is also described.

6 Claims, 1 Drawing Sheet

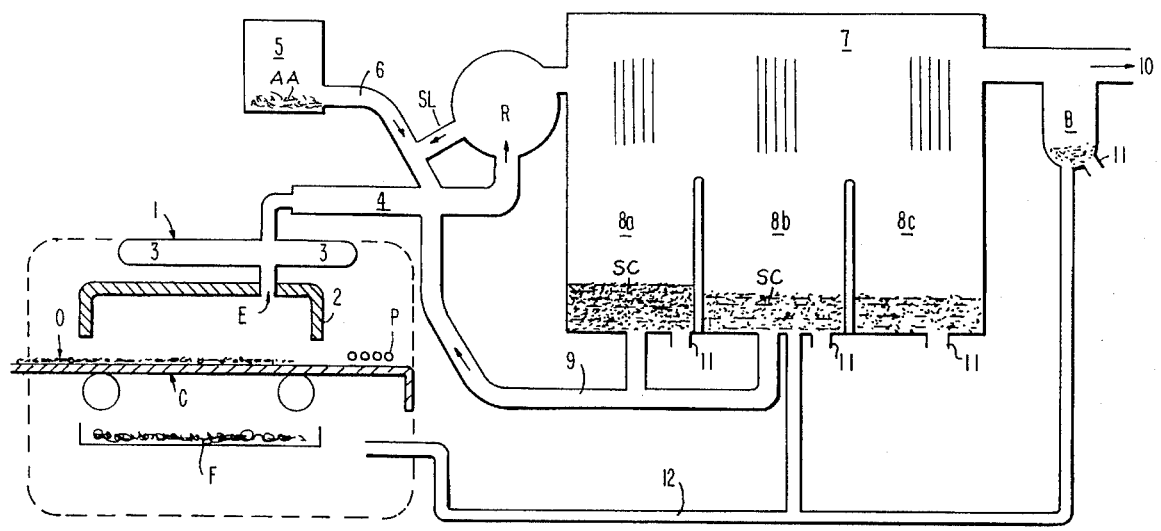

PROCESS AND APPARATUS FOR SEPARATING POLYCYCLIC AND POLYHALOGENATED HYDROCARBONS FROM EXHAUST GAS OF A SINTERING PROCESS

BACKGROUND OF THE INVENTION

This invention relates to a process and an apparatus for separating polycyclic and polyhalogenated hydrocarbons, particularly polyhalogenated dibenzodioxins and dibenzofurans, from the exhaust gas of a sintering process, particularly a process of sintering iron ore.

Fine-grained or pulverized materials can be compacted by sintering to provide shapes, such as granules and pellets, which can more easily be handled. Sintering is used, e.g., to compact ores. For that purpose the fine-grained ore is mixed with fine-grained carbonaceous fuels, is agglomerated and is heated to temperatures above 1000° C. in sintering plants supplied with oxygen-containing gases. The agglomerates of sintered ore consist of granules or pellets and have a certain mechanical strength so that they can readily be reduced to metals, e.g., in blast furnaces. Sinter roasting is used to roast fine-grained sulfide ores and to process them at the same time to form sintered granules and pellets.

Sintering involves a decomposition, particularly of carbonates and sulfates, an oxidation of sulfides, an evaporation of readily volatile oxides, sulfides, and chlorides, and an expulsion of bound water. As a result, the exhaust gases formed in the sintering process contain the gaseous reaction products CO and $CO_2$ formed by the combustion of carbon and the gaseous pollutants which have been released from the ores.

Since halogenides, particularly chlorides, as well as carbon are present during the sintering process, polycyclic and polyhalogenated hydrocarbons and particularly polyhalogenated dibenzodioxins (PCDD) and polyhalogenated dibenzofurans (PCDF) are formed, which are contained in the exhaust gas stream leaving the sintering plant. Finally, the exhaust gas stream from the sintering process is contaminated with dust-like solid particles. The gaseous pollutants, particularly CO, $SO_2$, HCl and HF, as well as the dust and the polycyclic and polyhalogenated hydrocarbons, particularly the polyhalogenated dibenzodioxins and dibenzofurans, must be separated from the exhaust gas before it is discharged into the atmosphere.

Published German Patent Application 41 05 214 discloses the purification of the exhaust gas stream from a sintering plant in a process in which the exhaust gas stream withdrawn from sintering conveyors is dedusted in an electrostatic precipitator plant, the exhaust gas stream leaving the electrostatic precipitator plant is moistened with a finely dispersed aqueous treating solution, which contains hydrogen peroxide, the exhaust gas stream is subsequently fed to a scrubber, which contains a corona electrode assembly and a succeeding scrubbing zone, wherein the exhaust gas stream which has been moistened and has been conducted through the corona electrode assembly in a dropless state is contacted in the scrubbing zone of the scrubber with a finely dispersed scrubbing liquid, which contains finely ground activated carbon or finely ground hearth furnace coke. In an alternative of the known process, the moistened exhaust gas stream which has been conducted through the corona electrode assembly in a dropless state is contacted in the scrubbing zone of the scrubber with a finely dispersed scrubbing liquid, which is conducted in a scrubbing liquid circuit and before entering the scrubber is passed through an activated carbon filter or a bed of granular hearth furnace coke.

Published German Patent Application 41 13 597 discloses for the purification of exhaust gas a process in which dust, HCl, HF, $SO_2$ and optionally $NO_x$ are removed and pollutants, particularly dioxins and furans, are removed by adsorption by an adsorbent, which consists of zeolites having a $SiO_2$-to-$Al_2O_3$ mole ratio of 2 to 6. In that process it is also contemplated that the exhaust gas is first mixed with the zeolites and is subsequently passed through a cloth filter, which contains a filter layer, and 30 to 700 mg zeolites having a particle diameter of 1 to 100 micrometers, particularly of 5 to 20 micrometers, are supplied to the exhaust gas per $m^3$ thereof.

Published German Patent Application 40 12 982 discloses for the purification of gases and exhaust gases to remove inorganic and organic pollutants a process in which finely powdered activated alumina, silica gel, diatomite, finely powdered zeolites and/or similar inorganic substances are blown into the gas stream, gas and solids are intensely mixed, the solids are applied to a filter surface and are left on the filter as a renewable loose adsorbent layer having a sufficient depth, and the pollutant-laden solids are mechanically removed from there. In the known process it is contemplated to use the inorganic surfactants in the form of a finely powdered material having a particle size distribution in which 100% of the particles are less than 100 micrometers, preferably less than 50 micrometers. That process is to be used, inter alia, to separate dioxins and furans.

Published German Patent Application 41 28 106 describes the selective separation of highly condensed polycyclic hydrocarbons, particularly of halogenated dibenzodioxins and dibenzofurans, from previously dedusted exhaust gases, which contain $SO_2$, $H_2O$, and heavy metals, in a process in which the hydrocarbons are adsorbed on solid adsorbents, which consist of a dealuminized zeolite, which has an $SiO_2/Al_2O_3$ ratio from 20:1 to 1000:1; when the adsorption is effected at a temperature from 20° to 200° C.; the zeolite has a particle diameter from 1 to 5 mm and is contained in a fixed bed reactor or a moving-bed reactor.

German Patent Application P 44 03 244.7 discloses for the purification of oxygen-containing exhaust gases formed by the incineration of garbage, industrial waste materials, and sewage sludge a process in which polyhalogenated hydrocarbons, inter alia, are removed from the exhaust gases by adsorption on zeolites, the exhaust gases above their dew point are reacted at a temperature from 80° to 180° C. and a gas velocity from 3 to 20 meters per second with a mixture of naturally occurring zeolites in a gas-solids suspension for a reaction time from 0.5 to 10 seconds, wherein the median particle size of the mixed zeolites is from 5 to 50 micrometers and the mean suspension density of the gas-solids suspension is from 0.02 to 10 kg solids per $sm^3$ of exhaust gas ($sm^3$=standard cubic meter of dry gas).

Finally, German Patent Application P 44 13 280.8 discloses the separation of polyhalogenated dibenzodioxins and dibenzofurans from the exhaust gas from a sintering process, particularly a process of sintering iron ore, in a process in which the entire dust-containing exhaust gas from the sintering conveyor is contacted above the dew point at a temperature from 90° to 180° C. and at a velocity from 6 to 20 meters per second with a mixture of naturally occurring zeolites in a gas-solids suspension for a reaction time from 0.5 to 10 seconds, wherein the median particle diameter $d_{50}$ of the mixed zeolites is from 5 to 100 micrometers, the mean suspension density of the gas-solids suspension is from 5 to 4500 g solids per sm³ exhaust gas, the dust and the mixed zeolites are subsequently jointly separated from the gas-solids suspension, and part of the separated solids are again contacted with the exhaust gas from the sintering conveyor. That known process is carried out in an apparatus which consists of a solids-entraining reactor, a multifield electrostatic precipitator, and a solids recycle line, which connects the collecting space of the first field of the electrostatic precipitator or the collecting spaces of the first and second fields of the electrostatic precipitator to the exhaust line leading to the solids-entraining reactor. In that apparatus the electrostatic precipitator may be replaced by a bag filter.

SUMMARY OF THE INVENTION

It is an object of the invention to provide a process for purification of exhaust gases from sintering processes in which capital investment, amounts of products and operating costs are minimized and which produces products which can be dumped substantially without difficulty or which can be processed in the sintering process or can be recycled to the purification process after regeneration.

It is also an object of the invention to utilize inorganic materials as adsorbents as much as possible and to minimize the use of activated carbon as an adsorbent so that risks involved in such use regarding operating safety of the absorption plants can be avoided as much as possible.

It is another object of the invention to provide a purification process which meets new and more rigorous requirements regarding the purification efficiency and the economy of the process.

It is an additional object of the invention to provide a purification process for exhaust gases from sintering processes, which ensures that low pollutant concentrations are maintained in the purified gas while maintaining process economy, even in case of fluctuations of concentrations of several pollutants, especially maintaining polyhalogenated dibenzodioxin and dibenzofuran concentration <0.1 ng TE per sm³ (TE=toxicity equivalent in accordance with the NATO standard).

A further object of the invention is to provide an apparatus for carrying out the process for purification of exhaust gases from sintering processes according to the invention.

According to the invention, the entire exhaust gas from the sintering conveyor is contacted above the dew point at a temperature from 90° to 180° C. and at a velocity from 6 to 20 meters per second with a solid adsorption agent comprising clays, layer silicates, and diatomaceous earth or mixtures thereof within a gas-solids suspension for a reaction time from 0.5 to 10 seconds; dust and the other solids in the gas-solids suspension are subsequently jointly separated from the gas-solids suspension to form separated solids and part of the separated solids is again contacted with the exhaust gas from the sintering conveyor. The median particle diameter, $d_{50}$, of the solid adsorption agent is from 5 to 100 micrometers and the mean suspension density of the gas-solids suspension is from 5 to 500 g solids per sm³ exhaust gas.

The process in accordance with the invention can be carried out to reliably provide a pure gas containing polyhalogenated dibenzodioxins and dibenzofurans in a concentration <0.1 ng TE per sm³ although the contaminated exhaust gas from the sintering process may contain polyhalogenated dibenzodioxins and dibenzofurans in an amount from 1 to 10 ng TE per sm³. Besides, the purified gas contains <50 ng/sm³ polycyclic hydrocarbons and <150 ng/sm³ polyhalogenated hydrocarbons. The content of carbon in organic compounds in the purified gas is <10 mg/sm³. The gas velocity from 6 to 20 meters per second which is contemplated according to the invention is achieved by bringing dust-containing exhaust gas from the sintering conveyor into contact with the solid adsorption agent in a solids-entraining reactor. The clays are naturally occurring aluminosilicates having a layer silicate structure and different water contents. Diatomaceous earth (diatomate) is a fine-grained powder and consists of 70 to 90% amorphous silica, 3 to 12% water, and small amounts of organic components. The diatomaceous earth is normally fumed and is chemically inert and melts at 1200° to 1700° C.

It is also contemplated in accordance with the invention to use kaolinite, bentonite, illite or mixtures thereof as the clays. The clays have proved to be particularly satisfactory in the practice of the process because their use has the result that the pure gas reliably contains the pollutants in the above-mentioned concentrations and, as a rule, in even lower concentrations, although the adsorption is effected in the presence of the dust, the water vapor, and the pollutants contained in the exhaust gas. Kaolinite has the composition $Al_2O_3 \cdot 2SiO_2 \cdot 2H_2O$ and the water is chemically bound and escapes only at temperatures from 390° to 450° C. The kaolinite has a layered structure. Bentonite is a bleaching earth. Illite is a mica-like clay mineral having the composition $$K_{0.7}(Al_2, Mg_3, Fe_2^{3+}, Fe_3^{2+})(OH)_2(Si_{3.3}Al_{0.7}O_{10})$$

It is also contemplated in accordance with the invention that 2 to 5% by weight activated carbon can advantageously be mixed with the preferred clays, the layer silicates, the diatomaceous earth or the mixtures of the substances. That measure does not adversely affect the safety of the plant in operation and increases the adsorption capacity of the process. For the purpose of the invention it also can be desirable to add 10 to 40% by weight of a mixture of naturally occurring zeolites to the solid adsorption agent, i.e. to the clays, the layer silicates, the diatomaceous earth or the mixtures consisting of the substances. These mixed zeolites preferably consist of 10 to 20% by weight mordenite, 60 to 70% by weight clinoptilonite, 0 to 5% by weight montmorillonite, with the balance $SiO_2$. This embodiment of the process particularly ensures that the price of the adsorbent is low while the efficiency of the process is not adversely affected.

The apparatus for performing the process according to the invention consists of a solids-entraining reactor, a multifield electrostatic precipitator, and a solids recycle line, which connects the collecting space of the first field of the electrostatic precipitator or the collecting spaces of the first and second fields of the electrostatic precipitator to the exhaust gas line leading to or advantageously comprising the solids-entraining reactor. The polycyclic and polyhalogenated hydrocarbons, preferably the polyhalogenated dibenzodioxins and dibenzofurans, and the dust-like solid particles, which are contained in the exhaust gas from sintering can be substantially completely separated by this apparatus so that the exhaust gas leaving the electrostatic precipitator contains <40 mg/sm³ dust and contains polyhalogenated dibenzodioxins and dibenzofurans in concentrations <0.1 ng TE per sm³. The gaseous pollutants contained in the exhaust gas, particularly CO, $SO_2$, HCl, and HF, can be removed from the exhaust gas stream in known manner by following purification processes.

In an additional embodiment or preferred feature of the invention the electrostatic precipitator can be connected to a downstream bag filter so that the additionally purified gas from the bag filter has a dust content which is significantly below 40 mg/sm$^3$ and peak dust content in the raw gas can be handled.

Alternatively, the object underlying the invention can be accomplished by an apparatus which performs the process according to the invention and consists of a solids-entraining reactor, a bag filter having a collecting space and a solids recycle line which connects the collecting space of the bag filter to the exhaust gas line leading to or comprising the solids-entraining reactor. That apparatus can also be used to substantially completely separate the dust-like solid particles and the polyhalogenated dibenzodioxins and dibenzofurans so that the exhaust gas stream leaving the bag filter contains dust in a concentration <50 mg/sm$^3$ and polyhalogenated dibenzodioxins and dibenzofurans in a concentration <0.1 ng TE per sm$^3$.

According to one embodiment the exhaust gas line conducting the exhaust gas from the sintering conveyor consists of a solids-entraining reactor. This results in a simplification of the apparatus in accordance with the invention so that capital investment and operating costs are decreased.

Finally it is contemplated in other embodiments that for the purposes of the invention a cyclone is provided between the solids-entraining reactor and the multifield electrostatic precipitator which communicates through a solids line with the solids-entraining reactor. The cyclone relieves the following process equipment and the recovered solids separated by the cyclone are recycled to the solids-entraining reactor.

BRIEF DESCRIPTION OF THE DRAWING

The objects, features and advantages of the present invention will now be illustrated in more detail by the following detailed description, reference being made to the accompanying drawing in which:

The sole figure is a diagrammatic view of an apparatus for performing one embodiment of the process according to the invention.

DESCRIPTION OF THE PREFERRED EMBODIMENTS

The sintering machine 1 consists of a sintering conveyor C and is used to make iron ore pellets P from agglomerates, which contain fine-grained iron ore 0 and fine-grained coke F. The iron ore pellets P are then fed to a blast furnace B. Exhaust gas E is fed at a rate of about 5000 sm$^3$/h from an exhaust gas hood 2 of the sintering conveyor C to the heat exchanger 3, in which the exhaust gas E is cooled to about 200° C. The exhaust gas then enters an exhaust gas line which consists of a solids-entraining reactor 4. The exhaust gas flowing in the solids-entraining reactor 4 has the following composition:

TABLE I

GAS COMPOSITION IN THE SOLIDS-ENTRAINING REACTOR

| | |
|---|---|
| $N_2$ | 26 to 73% |
| $O_2$ | 7 to 18% |
| $H_2O$ | 6 to 36% |
| $CO_2$ | 4 to 23% |
| CO | 0.1 to 1% |
| $SO_2$ | 100 to 200 mg/sm$^3$ |

TABLE I-continued

GAS COMPOSITION IN THE SOLIDS-ENTRAINING REACTOR

| | |
|---|---|
| HCl | 50 to 80 mg/sm$^3$ |
| HF | <10 mg/sm$^3$ |
| dust | 400 to 600 mg/sm$^3$ |
| dibenzodioxins and dibenzofurans | 1 to 10 ng TE/sm$^3$ |

The solids-entraining reactor 4 fed from the supply bin 5 through the feed line 6 with 0.1 to 2 g/sm$^3$ exhaust gas of a pneumatically conveyed mixture of a solid adsorption agent AA consisting of 50% by weight bentonite and 50% by weight kaolinite so that the solid adsorption agent contacts exhaust gas flowing through the solids-entraining reactor 4. The mixed adsorbents have a median particle diameter $d_{50}$ of 20 micrometers. As a result of heat losses and effects of mixing the gas-solids suspension conducted in the solids-entraining reactor 4 assumes a temperature of about 140° C. and at that temperature enters an electrostatic precipitator 7, which consists of three fields, with which respective dust bins or collection spaces 8a, 8b, 8c are associated. About 90% by weight of the dust and mixed adsorbents are collected in the dust bin 8a of the first field of the electrostatic precipitator 7. About 4% by weight of the dust and mixed adsorbents are collected in the dust bin 8b and about 1% in the dust bin 8c so that the purified gas leaving the electrostatic precipitator 7 contains <40 mg/sm$^3$ dust. In a steady-state equilibrium, 5 to 100 g of the mixed solids per sm$^3$ exhaust gas are recycled from the dust bin 8a to the solids-entraining reactor 4 so that the mixed adsorbents are contacted several times with the exhaust gas in the solids-entraining reactor. The collected solids SC in the collection spaces are supplied to the solids-entraining reactor 4 through the recycle line 9. The purified exhaust gas which leaves the electrostatic precipitator 7 through line 10 contains polyhalogenated dibenzodioxins and dibenzofurans in a concentration 0.1 ng TE per sm$^3$ and is at a temperature of about 120° C. Before it is discharged into the atmosphere, the still existing gaseous pollutants, particularly CO, $SO_2$, HCl, and HF, may be separated by following purification processes. The solids collected in the dust bins 8b and 8c are mainly enriched with the alkali salts and are discharged through line 11. A part of the solids from the dust bin 8a are removed from the system and recycled to the sintering plant 1 through line 12. The solids leaving the line 11 are deposited in a dump.

Also shown in the drawing a bag filter B can be connected downstream of the electrostatic precipitator 7 to further purify the purified gas from the electrostatic precipitator 7 by removing additional dust. Collected solid residues can also be returned from the bag filter B to the reactor 4 via a line connected to line 12. A cyclone R can be connected to receive the gas-solids suspension from the solids-entraining reactor 4 and to recover recovered solids for return to the reactor 4 via return line SL. The cyclone R delivers partially purified gas to the electrostatic precipitator 7 in the embodiment shown in the drawing.

The electrostatic precipitator 7 can be replaced by a bag filter in additional embodiments not shown in the drawing.

While the invention has been illustrated and described as embodied in a process and apparatus for purifying exhaust gases from a sintering process, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A process of separating polycyclic and polyhalogenated hydrocarbons from an exhaust gas of a sintering process, said exhaust gas containing dust and said process comprising the steps of bringing the entire exhaust gas from the sintering process into contact with a solid adsorption agent consisting of at least one member selected from the group consisting of kaolinite, bentonite, illite, layer silicates, diatomaceous earth and mixtures thereof within a gas-solids suspension for a reaction time of from 0.5 to 10 seconds above a dew point of the exhaust gas at a temperature from 90° to 180° C. and at a velocity from 6 to 20 meters per second; subsequently separating said solid adsorption agent and said dust jointly from the gas-solids suspension to form separated solids and contacting said exhaust gas for the sintering process with a part of the separated solids; wherein said solid adsorption agent has a median particle diameter, $d_{50}$, of from 5 to 100 micrometers and the gas-solids suspension has a mean suspension density of from 5 to 500 g solids per sm$^3$ of said exhaust gas.

2. The process as defined in claim 1, wherein said polycyclic and polyhalogenated hydrocarbons comprise polyhalogenated dibenzodioxins and dibenzofurans.

3. The process as defined in claim 1, wherein said sintering process is a process of sintering iron ore performed in a sintering apparatus having a sintering conveyor.

4. A process of separating polycyclic and polyhalogenated hydrocarbons from an exhaust gas of a sintering process, said exhaust gas containing dust and said process comprising the steps of bringing the entire exhaust gas from the sintering process into contact with a solid adsorption agent consisting of 2 to 5% by weight of activated carbon and at least one member selected from the group consisting of kaolinite, bentonite, illite, layer silicates, diatomaceous earth and mixtures thereof within a gas-solids suspension for a reaction time of from 0.5 to 10 seconds above a dew point of the exhaust gas at a temperature from 90° to 180° C. and at a velocity from 6 to 20 meters per second; subsequently separating said solid adsorption agent and said dust jointly from the gas-solids suspension to form separated solids and contacting said exhaust gas for the sintering process with a part of the separated solids; wherein said solid adsorption agent has a median particle diameter, $d_{50}$, from 5 to 100 micrometers and the gas-solids suspension has a mean suspension density of from 5 to 500 g solids per sm$^3$ of said exhaust gas.

5. A process of separating polycyclic and polyhalogenated hydrocarbons from an exhaust gas of a sintering process, said exhaust gas containing dust and said process comprising the steps of bringing the entire exhaust gas from the sintering process into contact with a solid adsorption agent consisting of 10 to 40% by weight of a mixture of naturally occurring zeolites and at least one member selected from the group consisting of kaolinite, bentonite, illite, layer silicates, diatomaceous earth and mixtures thereof within a gas-solids suspension for a reaction time of from 0.5 to 10 seconds above a dew point of the exhaust gas at a temperature from 90° to 180° C. and at a velocity from 6 to 20 meters per second; subsequently separating said solid adsorption agent and said dust jointly from the gas-solids suspension to form separated solids and contacting said exhaust gas for the sintering process with a part of the separated solids; wherein said solid adsorption agent has a median particle diameter, $d_{50}$, of from 5 to 100 micrometers and the gas-solids suspension has a mean suspension density of from 5 to 500 g solids per sm$^3$ of said exhaust gas.

6. The process as defined in claim 5, wherein said zeolites consist of 10 to 20% by weight mordenite, 60 to 70% by weight clinoptilonite, 0 to 5% by weight montmorillonite, with a balance consisting of $SiO_2$.

* * * * *